(12) United States Patent
Brown, III (10) Patent No.: US 12,470,514 B2
(45) Date of Patent: Nov. 11, 2025

(54) SYSTEM AND METHOD FOR ACCESS POINT NAME MANAGEMENT

(71) Applicant: CyberReef Solutions Inc., Shreveport, LA (US)

(72) Inventor: Jamie Richmond Brown, III, Shreveport, LA (US)

(73) Assignee: CYBERREEF SOLUTIONS INC., Shreveport, LA (US)

( * ) Notice: Subject to any disclaimer, the term of this patent is extended or adjusted under 35 U.S.C. 154(b) by 69 days.

(21) Appl. No.: 18/505,616

(22) Filed: Nov. 9, 2023

(65) Prior Publication Data

US 2024/0163244 A1 May 16, 2024

Related U.S. Application Data

(60) Provisional application No. 63/424,258, filed on Nov. 10, 2022.

(51) Int. Cl.
*H04L 61/3015* (2022.01)
*H04L 101/375* (2022.01)
*H04L 101/668* (2022.01)

(52) U.S. Cl.
CPC .... *H04L 61/3025* (2013.01); *H04L 2101/375* (2022.05); *H04L 2101/668* (2022.05)

(58) Field of Classification Search
CPC ...................... H04L 61/3025; H04L 2101/375
See application file for complete search history.

(56) References Cited

U.S. PATENT DOCUMENTS

| | | | |
|---|---|---|---|
| 9,703,978 B2 | 7/2017 | Lim | |
| 10,171,331 B1 | 1/2019 | Workman et al. | |
| 10,200,251 B2 | 2/2019 | Martin et al. | |
| 10,223,366 B2 | 3/2019 | Lim | |
| 10,450,116 B2 | 10/2019 | Diaz et al. | |
| 10,452,623 B2 | 10/2019 | Nivala et al. | |
| 10,455,387 B2 * | 10/2019 | Nicholson | H04L 12/4641 |
| 10,693,673 B2 * | 6/2020 | Kekki | H04L 12/2898 |
| 10,700,991 B2 | 6/2020 | Khinvasara et al. | |
| 10,740,083 B2 | 8/2020 | Phipps | |
| 11,477,246 B2 | 10/2022 | Raleigh et al. | |
| 11,635,455 B2 | 4/2023 | Spanier et al. | |
| 2012/0246325 A1 * | 9/2012 | Pancorbo Marcos | H04L 43/00 709/227 |
| 2017/0118787 A1 * | 4/2017 | Kekki | H04L 69/14 |
| 2017/0264454 A1 * | 9/2017 | Kekki | H04W 8/005 |

(Continued)

*Primary Examiner* — David R Lazaro
(74) *Attorney, Agent, or Firm* — Jackson Walker LLP; Christopher J. Rourk (57) ABSTRACT

A system for access point name (APN) management, comprising an APN inventory system operating on a first processor that is configured to load one or more algorithms into working data memory to cause the first processor to generate a data structure that identifies a plurality of unassigned APN subnets. An order interface system operating on a second processor is configured to load one or more algorithms into working data memory to cause the second processor to generate a selection tool to allow a user to select one of a plurality of APN subnet options. An APN mapping system operating on a third processor is configured to load one or more algorithms into working data memory to cause the third processor to associate a customer account number with one of the unassigned APN subnets.

18 Claims, 3 Drawing Sheets

(56) References Cited

U.S. PATENT DOCUMENTS

| | | | | |
|---|---|---|---|---|
| 2018/0091323 | A1* | 3/2018 | Haag | H04L 12/5691 |
| 2018/0262625 | A1* | 9/2018 | McCarley | H04L 12/1407 |
| 2022/0311768 | A1* | 9/2022 | Hoewisch | H04L 63/0876 |
| 2024/0163244 | A1* | 5/2024 | Brown, III | H04L 41/0806 |

\* cited by examiner

SYSTEM AND METHOD FOR ACCESS POINT NAME MANAGEMENT

RELATED APPLICATIONS

The present application claims benefit of and priority to U.S. Provisional Patent Application 63/424,258, filed on Nov. 10, 2022, which is hereby incorporated by reference for all purposes as if set forth herein in its entirety.

TECHNICAL FIELD

The present disclosure relates generally to network access, and more specifically to a system and method for access point name management that allows faster provisioning.

BACKGROUND OF THE INVENTION

Access point names (APNs) allow organizations to manage network access by members, but require extended times to configure due to different technical requirement and features associated with the different system components.

SUMMARY OF THE INVENTION

A system for APN management is disclosed that includes an APN inventory system operating on a first processor that is configured to load one or more algorithms into working data memory to cause the first processor to generate a data structure that identifies a plurality of unassigned APN subnets. An order interface system operating on a second processor is configured to load one or more algorithms into working data memory to cause the second processor to generate a selection tool to allow a user to select one of a plurality of APN subnet options. An APN mapping system operating on a third processor is configured to load one or more algorithms into working data memory to cause the third processor to associate a customer account number with one of the unassigned APN subnets as a function of the selected APN subnet options.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

In the description that follows, like parts are marked throughout the specification and drawings with the same reference numerals. The drawing figures may be to scale and certain components can be shown in generalized or schematic form and identified by commercial designations in the interest of clarity and conciseness.

In one example embodiment, an access point name (APN) can be the name of a gateway device or system that provides an interface between a mobile network, such as a third generation (3G) network, a fourth generation (4G) network, a fifth generation (5G) network, a Global System for Mobile Communications (GSM) network, a general packet radio service (GPRS) network or other suitable mobile networks, and another computer network, such as a corporate intranet or the public Internet. A mobile device that will make a data connection must be configured with an APN to present to a mobile network carrier, which will use the identifier to determine various network connection parameters, such as IP address assignments, security attributes, private customer network attributes and so forth. For example, an APN can identify a packet data network (PDN) that a mobile data user will communicate with and the type of service, such as a connection to a Wireless Application Protocol (WAP) server or an application server, and other suitable types of service.

The innovations discussed herein can be implemented as one or more algorithms operating on one or more processors, as disclosed and described in greater detail in the FIGURES and elsewhere. Building APNs faster for improved management can be accomplished by allowing for a single build to service 50-75 customer devices based on options within the build, or any other suitable number of customer devices. The disclosed process manages an inventory of unassigned APN subnets to satisfy the customer and the need for time to implement modifications for the customer systems, the carrier systems, the operator systems and systems of other parties. The disclosed innovations transform the current APN ordering and provisioning systems into rapid APN deployment systems and provide the technical features of reducing the time required for APN deployment, allowing customers to select APN features of interest with minimal delay and to reduce the infrastructure associated with APN ordering and provisioning. The disclosed innovations implement processes that are not possible using human activities, such as the provisioning of an APN for a customer prior to the point in time when the customer has decided to order an APN.

In addition, a number of previously unidentified problems exist with access point network deployment and associated solutions. The present disclosure recognizes that customers need access to a new system to be able to request and turn up private networks through the use of APNs in a timely and consistent manner, and carriers need a new system that is consistent and dependable. Accordingly, the present disclosure provides new rapid APN deployment systems and algorithms for implementing quick start private networks that can reduce the time to provide an APN from 3-8 months to 3-5 days. While the present disclosure provides example embodiments of APNs, it is also relevant to deployment of other suitable private networks, such as virtual private networks (VPNs).

The disclosed rapid APN systems and algorithms allow an operator to build an inventory of unassigned APNs. Each unassigned APN can support 50-70+ customer devices, and activating an unassigned APN subnet becomes a simple and quick process. The operator can build an inventory of unassigned APNs with each carrier before a customer needs an APN, and once each unassigned APN is complete then the APN is made operational between the carrier and the operator. The customer can then request an APN from the operator and the operator can make a request to the carrier to associate the selected subnet with the customer's account within the carrier's back office. The APN subnet is made operational in the operator's network through its network management system, and the path and services are customized to the requesting customer's needs through the network manager system and customer portal system.

The customer can be identified by a customer identifier, and the Comm Plan/Rate Plan can be specific to the carrier and can be different per carrier and customer. A 'PDP ID' or a 'child APN' identifier can uniquely identify the APN/subnet being shared with the customer, a first IP address can indicate the first usable IP address in the subnet or PDP and a last IP address can indicate a last useable IP address in the subnet or PDP. The subnet can be the group of IP addresses that are usable in that subnet, and the subnet size can indicate the size of the subnet, such as in bandwidth, number of channels or other suitable metrics.

The customer/partner can request a new APN and the operator can determine the size of the needed subnet. The operator or customer can request the subnet to be shared. The carrier can share the APN subnet with the requesting customer, the operator can turn up the customer/partner first device, and the customer can then add devices at will for the service, or other suitable processes can also or alternatively be used.

The disclosed process builds an inventory of shared infrastructure for VPN/Multi-APNs (RapidAPN). Based on the carrier this can be done regionally to ensure the latency is kept to a minimum, or other suitable processes can also or alternatively be used.

Figure 1:
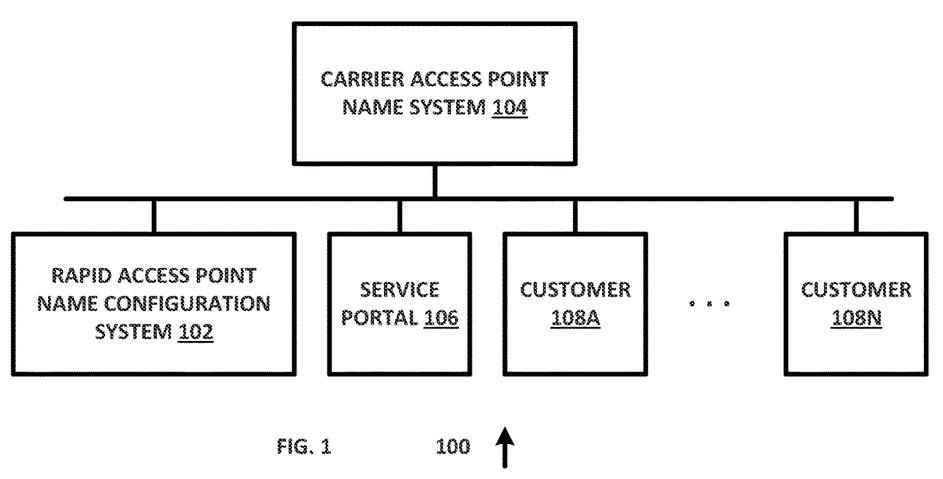
FIG. 1 is a diagram of a system for access point name deployment, in accordance with an example embodiment of the present disclosure.

FIG. 1 is a diagram of a system 100 for access point name deployment, in accordance with an example embodiment of the present disclosure. System 100 includes rapid access point name configuration system 102, carrier access point name system 104, service portal 106 and customer devices 108A-108N, each of which can be implemented in hardware or a suitable combination of hardware and software.

Rapid access point name configuration system 102 can be implemented as one or more algorithms that are loaded into working memory of a processor that causes the processor to generate a data structure for using coordinates of operator APN account inventory, such as technical parameters, account parameters and other suitable parameters, and to set up and manage customer use of operator APN accounts by reconfiguring the account for access by customer devices and operators. In one example embodiment, rapid access point name configuration system 102 allows a customer to access predetermined data fields associated with the APN account inventory and can modify allocable data fields in a data structure to associate an APN account with the customer, so as to make the APN account rapidly available for use by the customer and customer devices. In one example embodiment, the customer can configure parameters of specific customer devices, such as data usage, system access, security or other suitable parameters.

Carrier access point name system 104 can be implemented as one or more algorithms that are loaded into working memory of a processor that cause the processor to set up to generate a data structure for using operator APN accounts and customer APN accounts, such as to connect an APN subnet to a customer account or to perform other suitable function. In one example embodiment, a customer and an operator can each have an account, and a carrier can connect an APN subnet from the carrier account to a customer account. This algorithm provides the technical improvement of allowing a customer to obtain rapid access to an APN subnet, and transforms the configured carrier APN subnet to a customer APN subnet, unlike prior art systems and processes that would configure a customer APN subnet after a customer orders the APN subnet. Carrier access point name system 104 thus provides additional features and functions that are not available in the prior art. While a single carrier access point name system 104 is shown, a person of skill in the art will understand that a plurality of different carrier access point name systems can also or alternatively be provided.

Service portal 106 can be implemented as one or more algorithms that are loaded into working memory of a processor that cause the processor to allow a customer to interface with operator and carrier systems to interface with data structures to set up an account, place an order for an APN subnet, configure an APN subnet and for other suitable purposes. In one example embodiment, a customer can use an order interface system of service portal 106 to select an existing operator APN subnet and can order a second APN subnet, to provide rapid APN subnet access to customer devices while allowing the customer to further customize an APN subnet. In this manner, the present disclosure transforms existing systems that delay customer device APN subnet access into systems that can provide rapid APN subnet access. In one example embodiment, the APN subnets for a customer can be affiliated with a different carrier, where a single customer can be associated with APN subnets of different carriers though service portal 106 to facilitate management of customer devices on APN subnets of different carriers.

Customer devices 108A-108N can each be implemented as one or more algorithms that are loaded into working memory of a processor that cause the processor to associate the customer device to an APN subnet. In one example embodiment, each customer device 108A-108N can be configured to interface with an APN subnet using one or more specialized data structures, and access parameters can be selected using customer device settings, APN subnet settings or in other suitable manners.

In operation, system 100 transforms existing APN subnet ordering and provisioning systems into rapid APN subnet deployment systems, and provides the technical improvements of allowing customers to quickly obtain access to APN subnet services without the associated delay of prior art systems and processes. System 100 allows APN subnets to be configured before the customer selects the APN subnet, as opposed to after the selection is made, and thus provides numerous technical advantages as discussed and described herein and as are readily apparent to a person of skill in the art upon reading the present disclosure.

Figure 2:
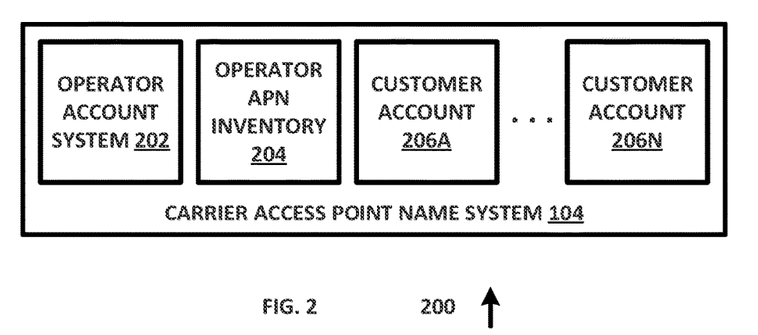
FIG. 2 is diagram of a system for carrier access point name configuration, in accordance with an example embodiment of the present disclosure.

FIG. 2 is diagram of a system 200 for carrier access point name configuration, in accordance with an example embodiment of the present disclosure. System 200 includes carrier access point name system 104 and operator account system 202, operator APN inventory 204 and customer account systems 206A-206N, each of which can be implemented in hardware or a suitable combination of hardware and software.

Operator account system 202 can be implemented as one or more algorithms that are loaded into working memory of a processor that cause the processor to create one or more data structures to define an operator account with a carrier, to configure APN subnet data structures and for other suitable purposes. In one example embodiment, an APN subnet data structure can include a number of data structures, such as a customer identifier, a communications plan name, an APN subnet identifier, a first and last allocated Internet protocol (IP) address that define a continuous range of IP addresses or other suitable addresses, a subnet Classless Inter-Domain Routing (CIDR) number, a subnet size or other suitable data structures.

Operator APN inventory 204 can be implemented as one or more algorithms that are loaded into working memory of a processor that cause the processor to create one or more data structures for management of operator APN inventory with a carrier. In one example embodiment, each carrier can have different account data structures, and operator APN inventory 204 can provide interface functionality to allow the operator to maintain its inventory and to interface with the carrier APN subnet operating and management systems.

Customer account systems 206A-206N can each be implemented as one or more algorithms that are loaded into working memory of a processor that cause the processor to create one or more data structures for management of a customer account with a carrier. In one example embodiment, customer account systems 206A-206N can allow a user to add or remove mobile devices from a customer account, to change access parameters for each mobile device including bandwidth and allowed/prohibited websites and so forth.

In operation, system 200 transforms existing APN subnet ordering and provisioning systems into rapid APN subnet deployment systems, and provides the technical improvements of allowing customers to quickly obtain access to APN subnet services without the associated delay of prior art systems and processes. System 200 allows APN subnets to be configured before the customer selects the APN subnet to allow the customer to configure access for customer devices on demand, as opposed to after the selection is made, and thus provides numerous technical advantages as discussed and described herein and as are readily apparent to a person of skill in the art upon reading the present disclosure.

Figure 3:
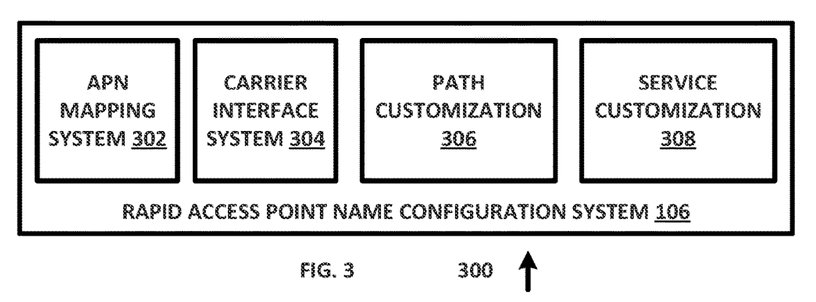
FIG. 3 is a diagram of a system for rapid access point name configuration, in accordance with an example embodiment of the present disclosure.

FIG. 3 is a diagram of a system 300 for rapid access point name configuration, in accordance with an example embodiment of the present disclosure. System 300 includes APN mapping system 302, carrier interface system 304, path customization system 306 and service customization system 308, each of which can be implemented in hardware or a suitable combination of hardware and software.

APN mapping system 302 can be implemented as one or more algorithms that are loaded into working memory of a processor that cause the processor to map an APN inventory data structure to customer account data structures associated with each APN inventory data structure. In one example embodiment, the mapping of the APN inventory data structures to the customer account data structures can be performed for each APN subnet at setup, and can then be checked and modified as needed. In another example embodiment, the mapping of the APN inventory data structures to the customer account data structures can be used as a management tool, a sales tool or for other suitable purposes. Mapping can also be used to verify that a customer account with the carrier exists, to coordinate modification of customer account data structures for APN subnets of different carriers, and for other suitable purposes.

Carrier interface system 304 can be implemented as one or more algorithms that are loaded into working memory of a processor that cause the processor to transmit operator commands to a carrier to connect and/or disconnect an APN subnet customer account. In one example embodiment, each carrier can have unique data structure requirements for transmitting and receiving operator commands, unique operator commands and other carrier-specific requirements. In addition, each carrier can have associated rules that apply to commands, and carrier interface system 304 can provide active guidance in selecting commands and entering data, such as by validating data compliance with rules or in other suitable manners.

Path customization system 306 can be implemented as one or more algorithms that are loaded into working memory of a processor that cause the processor to generate one or more user controls for operator customization of an APN subnet path. In one example embodiment, an APN subnet path can include data that defines user device bandwidth allocations, access controls, security or other suitable APN subnet path parameters, where modifications to the APN subnet path parameters are implemented by an operator using path customization system 306, and where limited access to a subset of predetermined parameters is provided to customers or in other suitable manners. Path customization system 306 can also be used to coordinate path customization of customer devices for APN subnets of different carriers.

Service customization system 308 can be implemented as one or more algorithms that are loaded into working memory of a processor that cause the processor to generate one or more controls for operator customization of APN subnet services. In one example embodiment, controls can be provided for global customization of APN subnet services for all APN subnets, such as address translation. Likewise, controls can be provided for customer-specific customization of APN subnet services for all customer devices assigned to an APN subnet or in other suitable manners. Path customization system 306 can also be used to coordinate service customization of customer devices for APN subnets of different carriers.

In operation, system 300 transforms existing APN subnet ordering and provisioning systems into rapid APN subnet deployment systems, and provides the technical improvements of allowing customers to quickly obtain access to APN subnet services without the associated delay of prior art systems and processes. System 300 allows APN subnets to be configured before the customer selects the APN subnet to allow the APN subnets to be configured on demand, as opposed to after the selection is made, and thus provides numerous technical advantages as discussed and described herein and as are readily apparent to a person of skill in the art upon reading the present disclosure.

Figure 4:
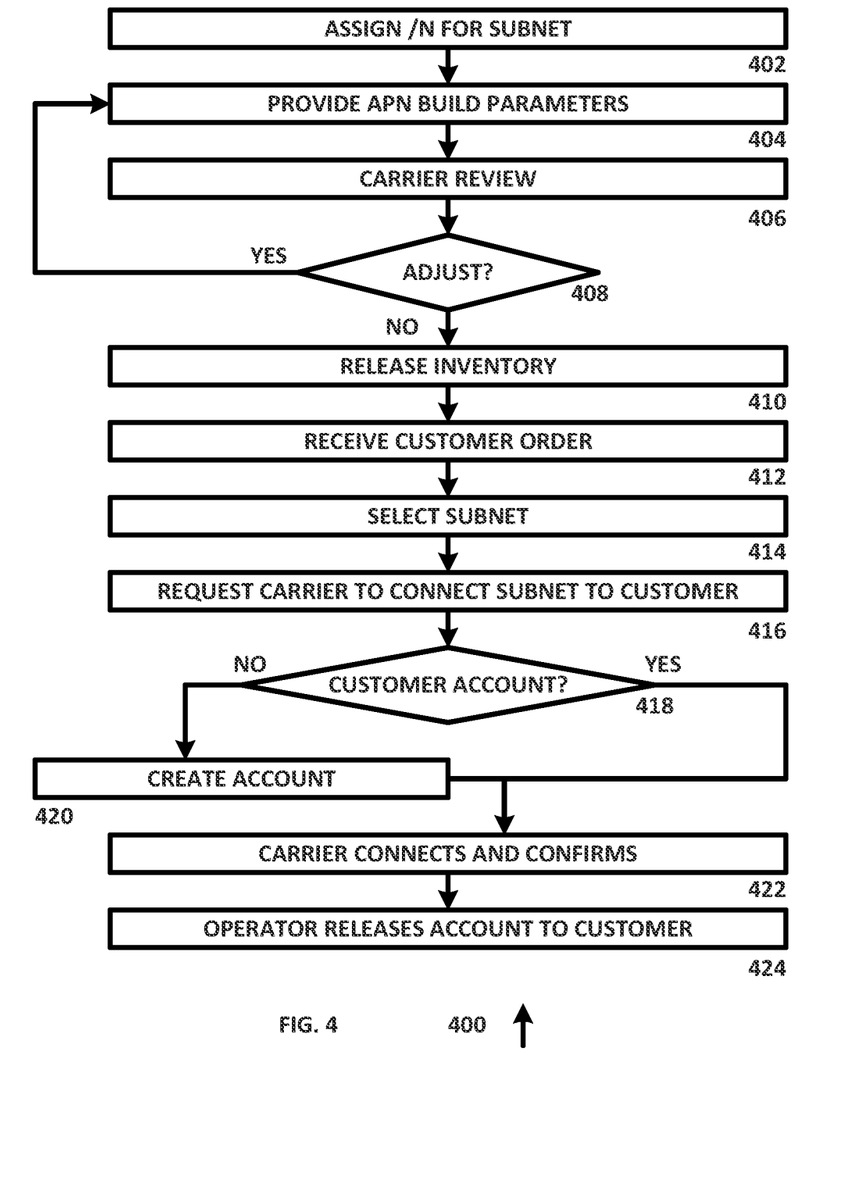
FIG. 4 is a diagram of an algorithm for access point name deployment, in accordance with an example embodiment of the present disclosure.

FIG. 4 is a diagram of an algorithm 400 for access point name deployment, in accordance with an example embodiment of the present disclosure. Algorithm 400 can be implemented in hardware or a suitable combination of hardware and software.

Algorithm 400 begins at 402, where a number of devices is assigned for an APN subnet. In one example embodiment, a number of devices can be associated with a bandwidth for each APN subnet, a range of IP addresses or other suitable parameters. The algorithm then proceeds to 404.

At 404, APN build parameters are provided to the carrier. In one example embodiment, the build parameters can be provided using an application programming interface for the carrier or other suitable data structures. A number of build parameters for a number of APN subnets can be provided, with a range of build parameters to allow the operator to have an inventory of available APN builds. The algorithm then proceeds to 406.

At 406, the carrier reviews the APN build parameters for implementation. In one example embodiment, the carrier can have internal procedures for placing an order, for implementing the order and provisioning the APN subnets. The algorithm then proceeds to 408.

At 408, it is determined whether adjustments are needed to the carrier build parameters. In one example embodiment, adjustments can be needed if parameters such as bandwidth are inconsistent with other parameters, such as subnet size. In another example embodiment, a subset of APN subnets may require additional data, adjustments or other suitable modifications. If it is determined that adjustments are needed, the algorithm can return to 404 where an indication of the reason for the adjustment can be provided or other suitable data can be provided, otherwise the algorithm proceeds to 410.

At 410, the APN subnets are received by the operator and released as inventory to the operator. In one example embodiment, the operator can provide an interface to allow the APN inventory to be reviewed by prospective customers or to otherwise allow third parties to evaluate the inventory for suitability. The algorithm then proceeds to 412.

At 412, the operator receives a customer order. In one example embodiment, the customer order can be placed at a user interface generated by the operator, and can include a number of parameters to assess whether the customer is suitable for the APN subnet or if a different APN subnet or other additional features should be provided. The algorithm then proceeds to 414.

At 414, the operator selects the APN subnet for the order. In one example embodiment, the APN subnet selected by the customer can be a representative APN subnet for a class of available APN subnets in inventory, and the operator can select the next available APN subnet, an APN subnet having suitable equipment based on the customer parameters or other suitable APN subnets. The algorithm then proceeds to 416.

At 416, the operator requests the carrier to connect the APN subnet to the customer. In one example embodiment, the request can be provided using a programming application interface that is unique to the carrier, using a data input structure or in other suitable manners. The algorithm then proceeds to 418.

At 418, the carrier determines if customer has an account. In one example embodiment, a customer account with the carrier can be a prerequisite for placing an order with the operator, the operator can pre-screen the customer for a carrier account, or other suitable processes can also or alternatively be used. If it is determined that the customer has a carrier account, the algorithm proceeds to 422, otherwise the algorithm proceeds to 420, where the carrier creates an account for the customer, such as by using existing account establishment tools. The algorithm then proceeds to 422.

At 422, the carrier connects the operator's APN subnet to the customer account and confirms the connection with the operator. The algorithm then proceeds to 424, where the operator releases the account to the customer.

In operation algorithm 400 allows a customer to rapidly obtain an APN subnet for use, without the delay that is required using the prior art. Rapid APN deployment is accomplished by creation of an inventory of APN subnets that can be allocated to customers before the customers place an order, thus eliminating the delay associated with establishing an APN subnet in the prior art, providing the customer with a streamlined and simplified ordering process and eliminating the potential for errors, mistakes or other problems that frequently arise in the prior art due to poor communication, errors, changes in customer needs between the time when the order is placed and when the order is released and numerous other problems with the prior art. Algorithm 400 transforms the prior art systems into a rapid APN system that provides the technical features identified above. While algorithm 400 is shown as a flow chart, a person of skill in the art will recognize that it can also or alternatively be implemented using object-oriented programming, a ladder diagram, a state diagram or in other suitable manners.

Figure 5:
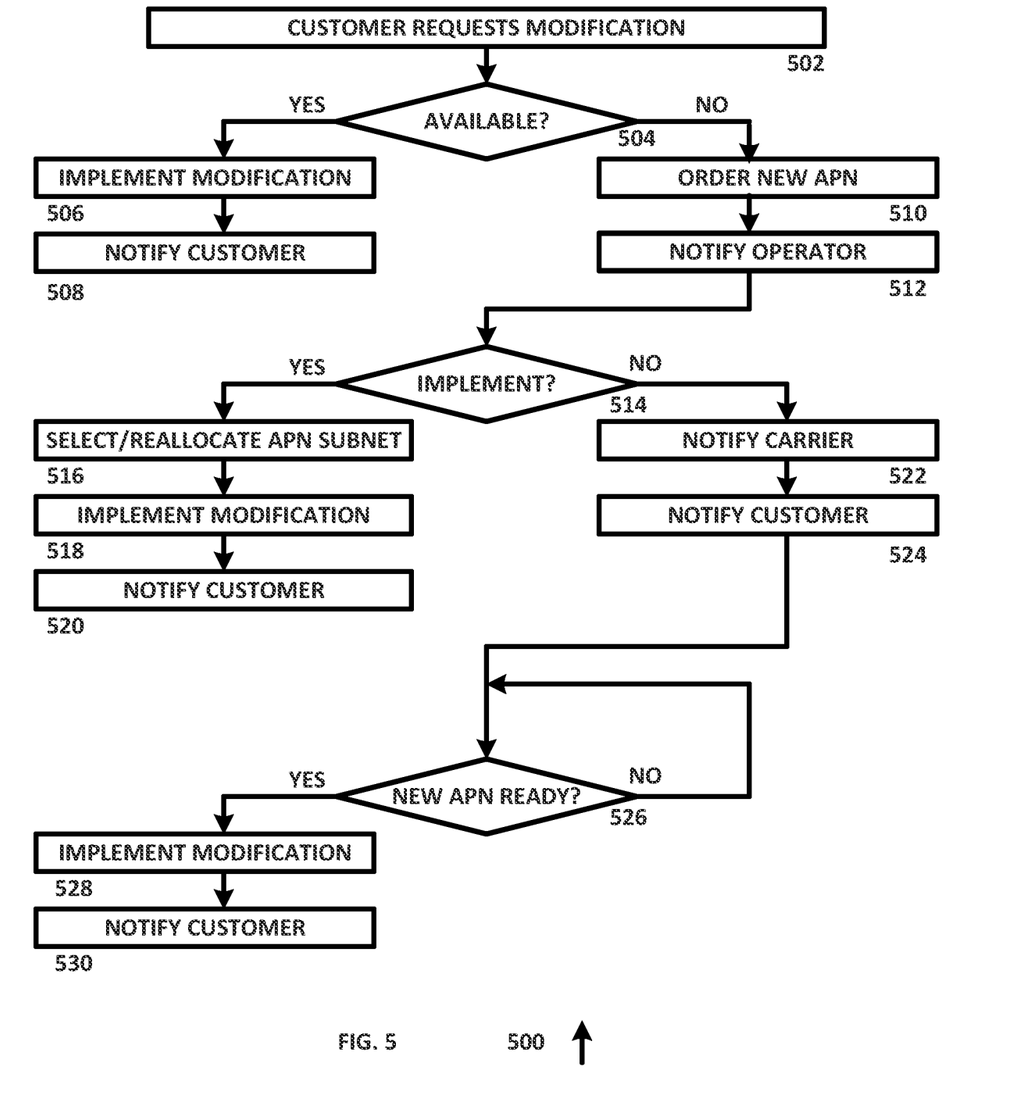
FIG. 5 is a diagram of an algorithm for modifying a customer access point name account, in accordance with an example embodiment of the present disclosure.

FIG. 5 is a diagram of an algorithm 500 for modifying a customer access point name account, in accordance with an example embodiment of the present disclosure. Algorithm 500 can be implemented in hardware or a suitable combination of hardware and software.

Algorithm 500 begins at 502, where a customer requests a modification to the customer's APN subnet. In one example embodiment, a customer can require a minor modification that can be made to an existing APN subnet or a more substantial modification that may require a new APN subnet to be implemented using the same customer interface control, which facilitates customer understanding of available features. The algorithm then proceeds to 504.

At 504, it is determined whether the requested modification is available for the customer's existing APN subnet. If the modification is available, the algorithm proceeds to 506 where the modification is implemented. Otherwise, the algorithm proceeds to 508, where the customer is notified that a new APN subnet is needed to implement the requested modification. The algorithm then proceeds to 510.

At 510, the new APN subnet is ordered. In one example embodiment, a user interface can be used to order the new APN subnet, using a checklist of available parameters and additional parameters that have an associated waiting time. In this manner, the customer can determine the optimal process for modification of the APN subnet, such as to increase the size of the APN subnet to an intermediate size while waiting for a larger APN subnet to be completed, or in other suitable manners. The algorithm then proceeds to 512.

At 512, the operator is notified of the APN subnet order. In one example embodiment, a suitable APN subnet can be selected from inventory if one is available, APN subnets can be reallocated or other suitable processes can also or alternatively be used. The algorithm then proceeds to 514.

At 514, it is determined whether the APN subnet modification can be implemented from inventory or reallocation, or if an order for a new APN subnet must be placed with the carrier. If an existing APN subnet can be used, the algorithm proceeds to 516, otherwise the algorithm proceeds to 522.

At 516, an existing APN subnet is selected from inventory, an APN subnet that is available to reallocated is identified or other suitable processes can also or alternatively be used. In one example embodiment, a different customer can have an underutilized APN subnet that could be used to implement the requested modification, and a request can be made to that other customer to optimize their APN subnet. Likewise, an APN subnet from inventory can be selected or other suitable processes can also or alternatively be used. The algorithm then proceeds to 518.

At 518, the modification is implemented, such as by associating the customer's account with the carrier with the operator's APN subnet from inventory, from a reallocation or in other suitable manners. Customer devices can be reconfigured to use new IP addresses and other suitable parameter changes can be implemented at the operator, customer and customer devices. The algorithm then proceeds to 520, where the customer is notified that the requested modification has been implemented.

If no APN subnets are available, the algorithm proceeds to 522 where the carrier is notified of the new APN subnet that is needed. The algorithm then proceeds to 524 where the customer is notified of the delay. After a predetermined waiting period, the algorithm proceeds to 526 where it is determined whether the new APN subnet is ready. If no, the algorithm returns to 526 after a delay, otherwise the algorithm proceeds to 528 where the modification is implemented, and the customer is notified at 530.

In operation algorithm 500 allows a customer to rapidly modify an APN subnet for use, without the delay that is required using the prior art. Rapid APN modification is accomplished by creation of an inventory of APN subnets that can be allocated to customers before the customer's request a modification, thus eliminating the delay associated with modifying an APN subnet in the prior art, providing the customer with a streamlined and simplified modification ordering process and eliminating the potential for errors, mistakes or other problems that frequently arise in the prior art due to poor communication, errors, changes in customer needs between the time when the order is placed and when the order is released and numerous other problems with the prior art. Algorithm 500 transforms the prior art systems into a rapid APN system that provides the technical features identified above. While algorithm 500 is shown as a flow chart, a person of skill in the art will recognize that it can also or alternatively be implemented using object-oriented programming, a ladder diagram, a state diagram or in other suitable manners.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for access point name (APN) management, comprising:
    an APN inventory system operating on a first processor that is configured to load one or more algorithms into working data memory of the first processor to cause the first processor to generate a data structure that identifies a plurality of unassigned APN subnets;
    an order interface system operating on a second processor that is configured to load one or more algorithms into working data memory of the second processor to cause the second processor to generate a selection tool to allow a user to select one of a plurality of APN subnet options; and
    an APN mapping system operating on a third processor that is configured to load one or more algorithms into working data memory of the third processor to cause the third processor to associate a customer account number with one of the unassigned APN subnets as a function of the selected APN subnet options.

2. The system of claim 1 further comprising a path customization system operating on a fourth processor that is configured to load one or more algorithms into working data memory of the fourth processor to cause the fourth processor to modify an APN subnet path of a selected user device.

3. The system of claim 1 further comprising a path customization system operating on a fourth processor that is configured to load one or more algorithms into working data memory of the fourth processor to cause the fourth processor to modify a bandwidth allocation of a selected user device.

4. The system of claim 1 further comprising a path customization system operating on a fourth processor that is configured to load one or more algorithms into working data memory of the fourth processor to cause the fourth processor to modify a security function of a selected user device.

5. The system of claim 1 further comprising a service customization system operating on a fourth processor that is configured to load one or more algorithms into working data memory of the fourth processor to cause the fourth processor to modify a device setting for all customer devices associated with an APN subnet.

6. The system of claim 1 further comprising a service customization system operating on a fourth processor that is configured to load one or more algorithms into working data memory of the fourth processor to cause the fourth processor to modify a device setting for all customer devices associated with a plurality of APN subnets.

7. The system of claim 1 further comprising a carrier interface system operating on a fourth processor that is configured to load one or more algorithms into working data memory of the fourth processor to cause the fourth processor to verify the customer account number with a carrier.

8. The system of claim 1 further comprising a service customization system operating on a fourth processor that is configured to load one or more algorithms into working data memory of the fourth processor to cause the fourth processor to modify a device setting for all customer devices associated with an APN subnet on each carrier of a plurality of carriers.

9. The system of claim 1 further comprising a path customization system operating on a fourth processor that is configured to load one or more algorithms into working data memory of the fourth processor to cause the fourth processor to modify a security function of all user devices on the APN subnet.

10. A method for network management, comprising:
    loading one or more algorithms into working data memory of a first processor to cause the first processor to generate a data structure that identifies a plurality of unassigned APN subnets;
    loading one or more algorithms into working data memory of a second processor to cause the second processor to generate a selection tool to allow a user to select one of a plurality of APN subnet options associated with one of the unassigned APN subnets; and
    loading one or more algorithms into working data memory of a third processor to cause the third processor to associate a customer account number with the one of the unassigned APN subnets as a function of the selected APN subnet options for that unassigned APN subnet.

11. The method of claim 10 further comprising loading one or more algorithms into working data memory of a fourth processor to cause the fourth processor to modify an APN subnet path of a selected user device based on a bandwidth allocation for the selected user device.

12. The method of claim 11 further comprising modifying a bandwidth allocation of a selected user device using an operator control.

13. The method of claim 11 further comprising modifying a security function of a selected user device using an operator control.

14. The method of claim 11 further comprising modifying a device setting for all customer devices associated with an APN subnet using an operator control.

15. The method of claim 11 further comprising modifying a device setting for all customer devices associated with a plurality of APN subnets using an operator control.

16. The method of claim 11 further comprising verifying the customer account number with a carrier using an operator control.

17. The method of claim 11 further comprising modifying a device setting for all customer devices associated with an APN subnet on each carrier of a plurality of carriers using an operator control.

18. The method of claim 11 further comprising modifying a security function of all user devices on the APN subnet using an operator control.

* * * * *